United States Patent
Cho et al.

(10) Patent No.: US 9,835,229 B2
(45) Date of Patent: Dec. 5, 2017

(54) MULTI-STAGE TRANSMISSION FOR VEHICLE

(71) Applicant: Hyundai Motor Company, Seoul (KR)

(72) Inventors: Won Min Cho, Hwaseong-si (KR); Jae Chang Kook, Hwaseong-si (KR); Myeong Hoon Noh, Seongnam-si (KR); Seong Wook Ji, Ansan-si (KR); Kang Soo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/877,767

(22) Filed: Oct. 7, 2015

(65) Prior Publication Data

US 2016/0258513 A1 Sep. 8, 2016

(30) Foreign Application Priority Data

Mar. 2, 2015 (KR) ........................ 10-2015-0029153

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC ... F16H 3/62; F16H 3/66; F16H 3/666; F16H 2200/0069; F16H 2200/2012; F16H 2200/2046
See application file for complete search history.

(56) References Cited

U.S. PATENT DOCUMENTS

| | | | |
|---|---|---|---|
| 7,556,582 B2 * | 7/2009 | Gumpoltsberger | F16H 3/66 475/271 |
| 7,632,206 B2 * | 12/2009 | Gumpoltsberger | F16H 3/66 475/275 |
| 8,052,566 B2 * | 11/2011 | Wittkopp | F16H 3/66 475/275 |
| 8,096,915 B2 * | 1/2012 | Wittkopp | F16H 3/666 475/282 |
| 8,303,455 B2 | 11/2012 | Gumpoltsberger et al. | |
| 8,864,618 B1 * | 10/2014 | Noh | F16H 3/62 475/278 |
| 9,033,846 B2 * | 5/2015 | Beck | F16H 3/666 475/275 |
| 9,151,363 B2 * | 10/2015 | Fellmann | F16H 3/66 |
| 9,382,980 B2 * | 7/2016 | Cho | F16H 3/66 |
| 9,435,406 B2 * | 9/2016 | Cho | F16H 3/66 |
| 9,482,319 B2 * | 11/2016 | Cho | F16H 3/66 |

(Continued)

FOREIGN PATENT DOCUMENTS

| | | |
|---|---|---|
| JP | 2014-35057 A | 2/2014 |
| KR | 10-2013-0064322 A | 6/2013 |

*Primary Examiner* — Terry Chau
(74) *Attorney, Agent, or Firm* — Morgan, Lewis & Bockius LLP

(57) ABSTRACT

A multi-stage transmission for a vehicle may include an input shaft, an output shaft, first, second, third, and fourth planetary gear devices disposed between the input shaft and the output shaft to transmit rotary force, each of the first, second, third, and fourth planetary gear devices having three rotary elements, and at least six shifting elements connected to the rotary elements of the planetary gear devices.

7 Claims, 1 Drawing Sheet

(56) References Cited

U.S. PATENT DOCUMENTS

2008/0171629 A1    7/2008   Hart et al.
2009/0017978 A1    1/2009   Phillips et al.
2016/0146299 A1*   5/2016   Cho ......................... F16H 3/66
                                                                          475/269

* cited by examiner

| SHIFTING STAGE | CL1 | CL2 | CL3 | CL4 | CL5 | CL6 | GEAR RATIO |
|---|---|---|---|---|---|---|---|
| 1ST |  | O |  |  | O | O | 2.920 |
| 2ND |  | O | O |  |  | O | 2.007 |
| 3RD |  |  | O |  | O | O | 1.880 |
| 4TH | O |  | O |  |  | O | 1.723 |
| 5TH |  |  | O | O |  | O | 1.625 |
| 6TH | O |  | O | O |  |  | 1.348 |
| 7TH | O |  |  | O | O |  | 1.000 |
| 8TH |  |  | O | O | O |  | 0.905 |
| 9TH |  | O |  | O | O |  | 0.793 |
| 10TH |  | O | O | O |  |  | 0.545 |
| REV | O | O |  |  |  | O | 2.471 |

MULTI-STAGE TRANSMISSION FOR VEHICLE

CROSS-REFERENCE TO RELATED APPLICATION

The present application claims priority to Korean Patent Application No. 10-2015-0029153, filed Mar. 2, 2015, the entire contents of which is incorporated herein for all purposes by this reference.

BACKGROUND OF THE INVENTION

Field of the Invention

The present invention generally relates to a multi-stage transmission for a vehicle and, more particularly, to a multi-stage transmission technology able to realize as many shifting stages as possible using the fewest parts possible and the simplest configuration possible, thereby improving fuel efficiency of a vehicle.

Description of Related Art

Recent rising oil prices have driven worldwide car manufacturers into unlimited competition to improve fuel efficiency. In addition, great efforts have been made to reduce the weight and improve the fuel efficiency of engines based on a variety of techniques such as downsizing.

Meanwhile, among methods that can be sought for transmissions equipped in vehicles to improve fuel efficiency, there is a method allowing an engine to operate at more efficient operation points using a multi-stage transmission, thereby ultimately improving the fuel efficiency.

Further, such a multi-stage transmission allows an engine to operate in a relatively low revolutions per minute (RPM) range, thereby further improving the quietness of a vehicle.

However, as the number of shifting stages of a transmission increases, the number of internal parts constituting the transmission also increases. This may lead to undesirable effects instead, such as the reduced mountability and transfer efficiency and the increased cost and weight of the transmission. Therefore, in order to maximize the effect of improved fuel efficiency using the multi-staging of a transmission, it is important to devise a transmission structure able to realize maximum efficiency using a relatively small number of parts and a simple configuration.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a multi-stage transmission for a vehicle that is able to realize at least ten forward shifting stages and one reverse shifting stage with a relatively small number of parts and a simple configuration such that an engine may be operated at optimum operation points, thereby maximizing an improvement in the fuel efficiency of the vehicle, and the engine may be operated more quietly, thereby improving the quietness of the vehicle.

According to various aspects of the present invention. a multi-stage transmission for a vehicle may include an input shaft, an output shaft, first, second, third, and fourth planetary gear devices disposed between the input shaft and the output shaft to transmit rotary force, each of the first, second, third, and fourth planetary gear devices having three rotary elements, and at least six shifting elements connected to the rotary elements of the planetary gear devices, in which a first rotary element of the first planetary gear device may be disposed to be fixable by one shifting element of the at least six shifting elements, a second rotary element of the first planetary gear device may be continuously connected to a second rotary element of the third planetary gear device and a third rotary element of the fourth planetary device, and a third rotary element of the first planetary gear device may be continuously connected to a first rotary element of the second planetary gear device and a third rotary element of the third planetary gear device, a second rotary element of the second planetary gear device may be continuously connected to the input shaft, and a third rotary element of the second planetary gear device may be selectively connected to a first rotary element and the second rotary element of the third planetary gear device, the first rotary element of the third planetary gear device may be selectively connected to a first rotary element and a second rotary element of the fourth planetary gear device, respectively, and the first rotary element of the fourth planetary gear device may be disposed to be fixable by another shifting element of the at least six shifting elements, and the second rotary element of the fourth planetary gear device may be continuously connected to the output shaft.

The first planetary gear device, the second planetary gear device, the third planetary gear device and the fourth planetary gear device may be sequentially arranged along an axial direction of the input shaft and the output shaft.

The first rotary element of the first planetary gear device may be disposed to be fixable to a transmission case by a second clutch from among the at least six shifting elements, the first rotary element of the fourth planetary gear device may be disposed to be fixable to the transmission case by a third clutch from among the at least six shifting elements, and the remaining shifting elements from among the at least six shifting elements may be configured to constitute selective connection structures between the rotary elements of the planetary gear devices.

A first clutch from among the at least six shifting elements may form a selective connection structure between the first rotary element of the third planetary gear device and the second rotary element of the fourth planetary gear device, a fourth clutch from among the at least six shifting elements may form a selective connection structure between the third rotary element of the second planetary gear device and the first rotary element of the third planetary gear device, a fifth clutch from among the at least six shifting elements may form a selective connection structure between the first rotary element of the third planetary gear device and the first rotary element of the fourth planetary gear device, and a sixth clutch from among the at least six shifting elements may form a selective connection structure between the third rotary element of the second planetary gear device and the second rotary element of the third planetary gear device.

According to various aspects of the present invention, a multi-stage transmission for a vehicle may include first, second, third and fourth planetary gear devices each having three rotary elements, six shifting elements configured to selectively provide frictional force, and first, second, third, fourth, fifth, sixth, seventh, and eighth rotary shafts connected to the rotary elements of the first, second, third and fourth planetary gear devices, in which the first rotary shaft may be an input shaft directly connected to a second rotary element of the second planetary gear device, the second rotary shaft may be directly connected to a first rotary element of the first planetary gear device, the third rotary shaft may be directly connected to a second rotary element of the first planetary gear device, a second rotary element of the third planetary gear device and a third rotary element of the fourth planetary gear device, the fourth rotary shaft may be directly connected to a third rotary element of the first planetary gear device, a first rotary element of the second planetary gear device and a third rotary element of the third planetary gear device, the fifth rotary shaft may be directly connected to a third rotary element of the second planetary gear device, the sixth rotary shaft may be directly connected to a first rotary element of the third planetary gear device, the seventh rotary shaft may be directly connected to a first rotary element of the fourth planetary gear device, the eighth rotary shaft may be an output shaft directly connected to a second rotary element of the fourth planetary gear device, and the six shifting elements may include first, second, third, fourth, fifth, and sixth clutches, the first clutch may be disposed between the sixth rotary shaft and the eighth rotary shaft, the second clutch may be disposed between the second rotary shaft and a transmission case, the third clutch may be disposed between the third rotary shaft and the transmission case, the fourth clutch may be disposed between the fifth rotary shaft and the sixth rotary shaft, the fifth clutch may be disposed between the sixth rotary shaft and the seventh rotary shaft, and the sixth clutch may be disposed between the third rotary shaft and the fifth rotary shaft.

According to the present invention as set forth above, the multi-stage transmission for a vehicle can realize at least ten forward shifting stages and one reverse shifting stage with a relatively small number of parts and a simple configuration such that the engine may be operated at optimum operation points, thereby maximizing an improvement in the fuel efficiency of the vehicle, and the engine may be operated more quietly, thereby improving the quietness of the vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figures 1, 2:
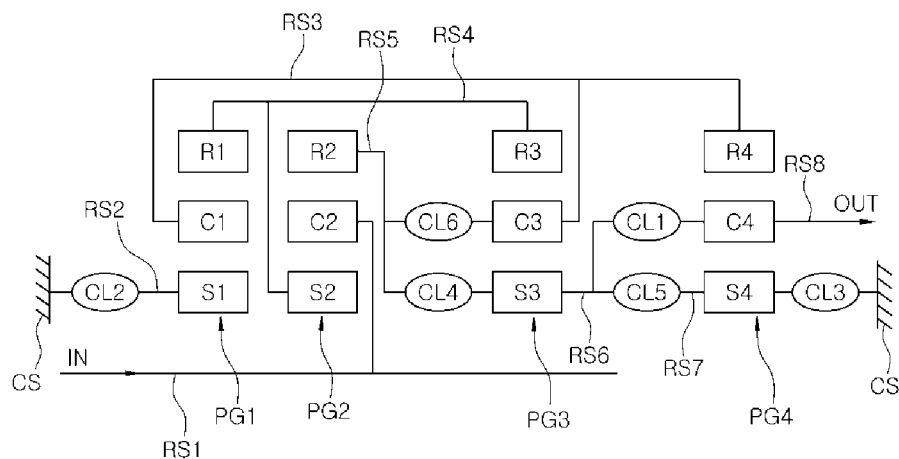
FIG. 1 is a diagram illustrating the configuration of an exemplary multi-stage transmission for a vehicle according to present invention.
FIG. 2 illustrates an operation mode table of the exemplary transmission shown in FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1 and FIG. 2, a multi-stage transmission for a vehicle according to various embodiments of the present invention may include an input shaft IN, an output shaft OUT, first to fourth planetary gear devices PG1, PG2, PG3 and PG4 disposed between the input shaft IN and the output shaft OUT to transmit rotary force, each of the first to fourth planetary gear devices PG1 to PG4 having three rotary elements, and at least six shifting elements connected to the rotary elements of the first to fourth planetary gear devices PG1 to PG4.

A first rotary element S1 of the first planetary gear device PG1 is installed to be fixable by one shifting element of the at least six shifting elements. A second rotary element C1 of the first planetary gear device PG1 is continuously connected to a second rotary element C3 of the third planetary gear device PG3 and a third rotary element R4 of the fourth planetary gear device PG4. A third rotary element R1 of the first planetary gear device PG1 is continuously connected to a first rotary element S2 of the second planetary gear device PG2 and a third rotary element R3 of the third planetary gear device PG3.

A second rotary element C2 of the second planetary gear device PG2 is continuously connected to the input shaft IN, and a third rotary element R2 of the second planetary gear device PG2 is continuously connected to a first rotary element S3 and the second rotary element C3 of the third planetary gear device PG3, respectively.

The first rotary element S3 of the third planetary gear device PG3 is selectively connected to a first rotary element S4 and a second rotary element C4 of the fourth planetary gear device PG4, respectively.

The first rotary element S4 of the fourth planetary gear device PG4 is installed to be fixable by another rotary element of the at least six shifting elements. The second rotary element C4 of the fourth planetary gear device PG4 is continuously connected to the output shaft OUT.

The first planetary gear device PG1, the second planetary gear device PG2, the third planetary gear device PG3 and the fourth planetary gear device PG4 are sequentially arranged along the axial direction of the input shaft IN and the output shaft OUT.

The first rotary element S1 of the first planetary gear device PG1 is installed to be fixable to a transmission case CS by means of a second clutch CL2 from among the at least six shifting elements. The first rotary element S4 of the fourth planetary gear device PG4 is installed to be fixable to the transmission case CS by means of a third clutch CL3 from among the at least six shifting elements.

Therefore, the second clutch CL2 and the third clutch CL3 function as brakes, respectively, such that the first rotary element S1 of the first planetary gear device PG1 and the first rotary element S4 of the fourth planetary gear device PG4 may be converted to rotatable state or restrained state not to be rotated by means of the operations of the second clutch CL2 and the third clutch CL3, respectively.

The other shifting elements from among the at least six shifting elements are configured to constitute selective connection structures between the rotary elements of the planetary gear devices.

Specifically, a first clutch CL1 from among the at least six shifting elements forms a selective connection structure between the first rotary element S3 of the third planetary gear device PG3 and the second rotary element C4 of the fourth planetary gear device PG4. A fourth clutch CL4 from among the at least six shifting elements forms a selective connection structure between the third rotary element R2 of the second planetary gear device PG2 and the first rotary element S3 of the third planetary gear device PG3. A fifth clutch CL5 from among the at least six shifting elements forms a selective connection structure between the first rotary element S3 of the third planetary gear device PG3 and the first rotary element S4 of the fourth planetary gear device PG4. A sixth clutch CL6 from among the at least six shifting elements forms a selective connection structure between the third rotary element R2 of the second planetary gear device PG2 and the second rotary element C3 of the third planetary gear device PG3.

According to various embodiments, the first rotary element S1, the second rotary element C1 and the third rotary element R1 of the first planetary gear device PG1 are a first sun gear, a first carrier and a first ring gear, respectively. The first rotary element S2, the second rotary element C2 and the third rotary element R2 of the second planetary gear device PG2 are a second sun gear, a second carrier and a second ring gear, respectively. The first rotary element S3, the second rotary element C3 and the third rotary element R3 of the third planetary gear device PG3 are a third sun gear, a third carrier and a third ring gear, respectively. The first rotary element S4, the second rotary element C4 and the third rotary element R4 of the fourth planetary gear device PG4 are a fourth sun gear, a fourth carrier and a fourth ring gear, respectively.

The multi-stage transmission for a vehicle configured as above may also be presented as follows.

Specifically, the multi-stage transmission for a vehicle according to the present invention includes the first to fourth planetary gear devices PG1 to PG4 each having the three rotary elements, the six shifting elements configured to selectively provide frictional force, and eight rotary shafts connected to the rotary elements of the first to fourth planetary gear devices.

Hence, from among the eight rotary shafts, the first rotary shaft RS1 is the input shaft IN directly connected to the second rotary element C2 of the second planetary gear device PG2. The second rotary shaft RS2 is directly connected to the first rotary element S1 of the first planetary gear device PG1. The third rotary shaft RS3 is directly connected to the second rotary element C1 of the first planetary gear device PG1, the second rotary element C3 of the third planetary gear device PG3 and the third rotary element R4 of the fourth planetary gear device PG4. The fourth rotary shaft RS4 is directly connected to the third rotary element R1 of the first planetary gear device PG1, the first rotary element S2 of the second planetary gear device PG2 and the third rotary element R3 of the third planetary gear device PG3. The fifth rotary shaft RS5 is directly connected to the third rotary element R2 of the second planetary gear device PG2. The sixth rotary shaft RS6 is directly connected to the first rotary element S3 of the third planetary gear device PG3. The seventh rotary shaft RS7 is directly connected to the first rotary element S4 of the fourth planetary gear device PG4. The eighth rotary shaft RS8 is the output shaft OUT directly connected to the second rotary element C4 of the fourth planetary gear device PG4.

In addition, from among the six shifting elements, the first clutch CL1 is disposed between the sixth rotary shaft RS6 and the eighth rotary shaft RS8. The second clutch CL2 is disposed between the second rotary shaft RS2 and the transmission case CS. The third clutch CL3 is disposed between the seventh rotary shaft RS7 and the transmission case CS. The fourth clutch CL4 is disposed between the fifth rotary shaft RS5 and the sixth rotary shaft RS6. The fifth clutch CL5 is disposed between the sixth rotary shaft RS6 and the seventh rotary shaft RS7. The sixth clutch CL6 is disposed between the third rotary shaft RS3 and the fifth rotary shaft RS5.

As set forth above, the multi-stage transmission for a vehicle according to the present invention including the four simple planetary gear devices and the six shifting elements realizes ten forward shifting stages and one reverse shifting stage according to the operation mode table as illustrated in FIG. 2. Since the multi-stage shifting stages of ten shifting stages can be embodied based on a relatively small number of parts and a simple configuration, the multi-stage transmission for a vehicle can contribute to the improved fuel efficiency and quietness of a vehicle, thereby ultimately improving the marketability of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A multi-stage transmission for a vehicle comprising:
an input shaft;
an output shaft;
first, second, third, and fourth planetary gear devices disposed between the input shaft and the output shaft to transmit rotary force, each of the first, second, third, and fourth planetary gear devices having three rotary elements; and
at least six shifting elements connected to the rotary elements of the planetary gear devices,
wherein a first rotary element of the first planetary gear device is disposed to be fixable by one shifting element of the at least six shifting elements, a second rotary element of the first planetary gear device is continuously connected to a second rotary element of the third planetary gear device and a third rotary element of the fourth planetary device, and a third rotary element of the first planetary gear device is continuously connected to a first rotary element of the second planetary gear device and a third rotary element of the third planetary gear device, wherein a second rotary element of the second planetary gear device is continuously connected to the input shaft, and a third rotary element of the second planetary gear device is selectively connected to a first rotary element and the second rotary element of the third planetary gear device, wherein the first rotary element of the third planetary gear device is selectively connected to a first rotary element and a second rotary element of the fourth planetary gear device, respectively, and wherein the first rotary element of the fourth planetary gear device is disposed to be fixable by another shifting element of the at least six shifting elements, and the second rotary element of the fourth planetary gear device is continuously connected to the output shaft.

2. The multi-stage transmission according to claim 1, wherein the first planetary gear device, the second planetary gear device, the third planetary gear device and the fourth planetary gear device are sequentially arranged along an axial direction of the input shaft and the output shaft.

3. The multi-stage transmission according to claim 2, wherein:
the first rotary element of the first planetary gear device is disposed to be fixable to a transmission case by a second clutch from among the at least six shifting elements,
the first rotary element of the fourth planetary gear device is disposed to be fixable to the transmission case by a third clutch from among the at least six shifting elements, and
the remaining shifting elements from among the at least six shifting elements are configured to constitute selective connection structures between the rotary elements of the planetary gear devices.

4. The multi-stage transmission according to claim 3, wherein:
a first clutch from among the at least six shifting elements forms a selective connection structure between the first rotary element of the third planetary gear device and the second rotary element of the fourth planetary gear device,
a fourth clutch from among the at least six shifting elements forms a selective connection structure between the third rotary element of the second planetary gear device and the first rotary element of the third planetary gear device,
a fifth clutch from among the at least six shifting elements forms a selective connection structure between the first rotary element of the third planetary gear device and the first rotary element of the fourth planetary gear device, and
a sixth clutch from among the at least six shifting elements forms a selective connection structure between the third rotary element of the second planetary gear device and the second rotary element of the third planetary gear device.

5. A multi-stage transmission for a vehicle comprising:
first, second, third and fourth planetary gear devices each having three rotary elements;
six shifting elements configured to selectively provide frictional force; and
first, second, third, fourth, fifth, sixth, seventh, and eighth rotary shafts connected to the rotary elements of the first, second, third and fourth planetary gear devices, wherein the first rotary shaft is an input shaft directly connected to a second rotary element of the second planetary gear device, the second rotary shaft is directly connected to a first rotary element of the first planetary gear device, the third rotary shaft is directly connected to a second rotary element of the first planetary gear device, a second rotary element of the third planetary gear device and a third rotary element of the fourth planetary gear device, the fourth rotary shaft is directly connected to a third rotary element of the first planetary gear device, a first rotary element of the second planetary gear device and a third rotary element of the third planetary gear device, the fifth rotary shaft is directly connected to a third rotary element of the second planetary gear device, the sixth rotary shaft is directly connected to a first rotary element of the third planetary gear device, the seventh rotary shaft is directly connected to a first rotary element of the fourth planetary gear device, the eighth rotary shaft is an output shaft directly connected to a second rotary element of the fourth planetary gear device, and wherein the six shifting elements include first, second, third, fourth, fifth, and sixth clutches, the first clutch is disposed between the sixth rotary shaft and the eighth rotary shaft, the second clutch is disposed between the second rotary shaft and a transmission case, the third clutch is disposed between the seventh rotary shaft and the transmission case, the fourth clutch is disposed between the fifth rotary shaft and the sixth rotary shaft, the fifth clutch is disposed between the sixth rotary shaft and the seventh rotary shaft, and the sixth clutch is disposed between the third rotary shaft and the fifth rotary shaft.

6. The multi-stage transmission according to claim 5, wherein the first planetary gear device, the second planetary gear device, the third planetary gear device and the fourth planetary gear device are sequentially arranged along an axial direction of the input shaft and the output shaft.

7. The multi-stage transmission according to claim 5, wherein the first clutch is disposed to form a selective connection between the first rotary element of the third planetary gear device and the second rotary element of the fourth planetary gear device, the fourth clutch is disposed to form a selective connection between the third rotary element of the second planetary gear device and the first rotary element of the third planetary gear device, the fifth clutch is disposed to form a selective connection between the first rotary element of the third planetary gear device and the first rotary element of the fourth planetary gear device, and the sixth clutch is disposed to form a selective connection between the third rotary element of the second planetary gear device and the second rotary element of the third planetary gear device.

* * * * *